(12) United States Patent
Wargent et al.

(10) Patent No.: US 10,721,875 B2
(45) Date of Patent: Jul. 28, 2020

(54) CONTROLLING CHARACTERISTICS OF PHOTOSYNTHETIC ORGANISIMS

(71) Applicant: Biolumic Limited, Palmerston North (NZ)

(72) Inventors: Jason John Wargent, Palmerston North (NZ); Matthew John Van DerWerff, Palmerston North (NZ); Terry Robin Southern, Palmerston North (NZ)

(73) Assignee: BIOLUMIC LIMITED, Palmerston North (NZ)

( * ) Notice: Subject to any disclaimer, the term of this patent is extended or adjusted under 35 U.S.C. 154(b) by 573 days.

(21) Appl. No.: 15/117,157

(22) PCT Filed: Feb. 9, 2015

(86) PCT No.: PCT/NZ2015/000008
§ 371 (c)(1),
(2) Date: Aug. 5, 2016

(87) PCT Pub. No.: WO2015/119510
PCT Pub. Date: Aug. 13, 2015

(65) Prior Publication Data
US 2016/0345512 A1 Dec. 1, 2016

(30) Foreign Application Priority Data
Feb. 10, 2014 (NZ) ........................................ 621039

(51) Int. Cl.
*A01G 9/20* (2006.01)
*A01G 7/04* (2006.01)
(Continued)

(52) U.S. Cl.
CPC ............... *A01G 7/04* (2013.01); *A01G 7/045* (2013.01); *A01G 9/20* (2013.01); *F21V 19/02* (2013.01);
(Continued)

(58) Field of Classification Search
CPC .................................. A01G 9/20; A01G 7/045
See application file for complete search history.

(56) References Cited

U.S. PATENT DOCUMENTS

| 7,348,475 B2 | 3/2008 | Shin et al. |
| 8,001,722 B2 | 8/2011 | Wilson et al. |

(Continued)

FOREIGN PATENT DOCUMENTS

| CN | 103999748 A | 8/2014 |
| DE | 19900616 A1 | 7/2000 |

(Continued)

OTHER PUBLICATIONS

Mishra, A. Effect of UVB radiation on seed germination, seedling growth, photosynthetic pigments and biochemical responses of *Postum sativum* (L.). Photosynthetic Pigments and Biochemical Responses of *Pistum sativum* (L.) Zenith International Journal of Multidisciplinary Research, vol. 5(1), pp. 124-129 (2015).

(Continued)

*Primary Examiner* — Monica L Barlow
(74) *Attorney, Agent, or Firm* — Wilson Sonsini Goodrich & Rosati

(57) ABSTRACT

A light dosing system for promoting preferred characteristics in plants, the light dosing system configured to direct light onto a target area upon which the plant resides, the light dosing system including one or more light emitters positioned above the target area, a means for controlling one or more characteristics of the light emitted by the light emitters, a conveyor configured to alter the relative positions of the (Continued)

light emitters and the target area, and a lighting controller configured to read a media having a predefined dosage regime stored thereon for promoting the preferred characteristics of the plant, characterized in that the lighting controller is configured to alter one or more characteristics of the light emitted by the, or each, of the one or more light emitters onto the target area in accordance with the predefined dosage regime.

5 Claims, 4 Drawing Sheets

(51) Int. Cl.

| | | |
|---|---|---|
| H05B 45/22 | (2020.01) | |
| H05B 47/11 | (2020.01) | |
| H05B 47/105 | (2020.01) | |
| F21V 29/70 | (2015.01) | |
| F21V 19/02 | (2006.01) | |
| F21V 23/00 | (2015.01) | |

(52) U.S. Cl.
CPC ............ *F21V 23/003* (2013.01); *F21V 29/70* (2015.01); *H05B 45/22* (2020.01); *H05B 47/105* (2020.01); *H05B 47/11* (2020.01); *Y02P 60/149* (2015.11)

(56) References Cited

U.S. PATENT DOCUMENTS

| | | |
|---|---|---|
| 8,845,149 B2 | 9/2014 | Cheng et al. |
| 2006/0016125 A1 | 1/2006 | Krauss et al. |
| 2008/0120736 A1 | 5/2008 | Hurst |
| 2008/0298052 A1 | 12/2008 | Hurst et al. |
| 2009/0272029 A1 | 11/2009 | Aiking et al. |
| 2010/0193707 A1* | 8/2010 | Yamada .................. A01G 7/045 250/492.1 |
| 2011/0163246 A1 | 7/2011 | Ishiwata et al. |
| 2012/0054061 A1 | 3/2012 | Fok et al. |
| 2013/0008085 A1* | 1/2013 | Aikala .................. A01G 17/005 47/58.1 LS |
| 2013/0294065 A1 | 11/2013 | Wells |
| 2014/0204567 A1 | 7/2014 | Cheng et al. |
| 2016/0073599 A1 | 3/2016 | Wargent |
| 2016/0184237 A1 | 6/2016 | Lowe et al. |
| 2017/0000041 A1 | 1/2017 | Wargent |

FOREIGN PATENT DOCUMENTS

| | | |
|---|---|---|
| EP | 1300066 A1 | 4/2003 |
| EP | 2172097 A1 | 4/2010 |
| JP | 2001028947 A | 2/2001 |
| JP | 2004166638 A | 6/2004 |
| JP | 2005328734 A | 12/2005 |
| JP | 2006158262 A | 6/2006 |
| JP | 2010094109 A | 4/2010 |
| JP | 2013051939 A | 3/2013 |
| JP | 2013153691 A | 8/2013 |
| NZ | 702063 A | 11/2016 |
| TW | M458082 U | 8/2013 |
| WO | WO-0051414 A1 | 9/2000 |
| WO | WO-2012040838 A1 | 4/2012 |
| WO | WO-2012085336 A1 | 6/2012 |
| WO | WO-2015119510 A1 | 8/2015 |
| WO | WO-2015137825 A1 | 9/2015 |
| WO | WO-2016043605 A1 | 3/2016 |
| WO | WO-2016054268 A1 | 4/2016 |
| WO | WO-2018037281 A1 | 3/2018 |
| WO | WO-2019002946 A1 | 1/2019 |
| WO | WO-2019038594 A2 | 2/2019 |

OTHER PUBLICATIONS

Behn, H. et al. Development-dependent UV-B Responses in Red Oak Leaf Lettuce (*Lactuca sativa* L.): Physiological Mechanisms and Significance for Hardening, European Journal of Horticultural Science vol. 76, No. 2, pp. 33-40 (Jul. 2011).

Davey, M.P. et al. The UV-B photoreceptor UVR8 promotes photosynthetic efficiency in *Arabidopsis thaliana* exposed to elevated levels of UV-B, Photosynthesis Research, 2012, vol. 114, pp. 121-131.

Favory et al. Interaction of COP1 and UVR8 regulates UV-B-induced photomorphogenesis and stress acclimation in *Arabidopsis*, Embo Journal, 28(5); 591-601 (2009).

Heil et al. Induced systemic resistance (ISR) against pathogens—a promising field for ecological research, Perspectives in Plant Ecology, Evolution and Systematics, vol. 4, 2001, pp. 65-79.

IARC Monographs on the Evaluation of Carcinogenic Risks to Humans. vol. 55—Solar and ultraviolet radiation; Chapter 1; Exposure data (1992) (International Agency for Research on Cancer—World Health Organization).

Ibdah et al. Spectral dependence of flavonol and betacyanin accumulation in Mesembryanthemum crystallinum under enhanced ultraviolet radiation, Plant, Cell and Environment 25: 1145-1154 (2002).

International Application No. PCT/NZ2015/000008 International Preliminary Report on Patentability dated Apr. 19, 2016.

International Application No. PCT/NZ2015/000008 Written Opinion dated Jan. 14, 2016.

International Application No. PCT/NZ2015/000014 International Preliminary Report on Patentability dated Nov. 16, 2015.

International Application No. PCT/NZ2015/000014 Written Opinion dated Jun. 3, 2015.

International Application No. PCT/NZ2015/050153 International Search Report dated Nov. 23, 2015.

International Application No. PCT/NZ2015/050153 Written Opinion dated Feb. 18, 2016.

Jenkins, G.I. Signal Transduction in Responses to UV-B Radiation, Annual Review of Plant Biology, vol. 60, 2009, pp. 407-431.

Kubasek, W.L. et al. Regulation of flavonoid biosynthetic genes in germinating *Arabidopsis* seedlings, The Plant Cell, 1992, vol. 4, pp. 1229-1236.

Li, X. et al. Effect of UV-B irradiation on seed germination and seedling growth of *Arabidopsis*', Chinese Bulletin of Botany, 2013, vol. 48, pp. 52-58.

Marzocca, A. et al. Tratamiento de semillas de 'Kok-saghyz' con rayos ultravioletas, Revista de Investigaciones Agrícolas, 1957, vol. XI, pp. 227-245.

Sosa-Flores, V. P. et al. Study of morphological and histological changes in melon plants grown from seeds irradiated with UV-B, Journal of Applied Horticulture, Oct.-Dec. 2014, vol. 16, pp. 199-204.

Rizzini, L. et al. Perception of UV-B by the *Arabidopsis* UVR8 Protein, Science vol. 332, No. 6025; pp. 103-106 (2011).

Rozema, J. et al. UV-B as an environmental factor in plant life: stress and regulation, Trends in Ecology & Evolution, vol. 12, 1997, pp. 22-28.

Shaukat, S.S., et al. Effect of Supplemental UV-B Radiation on Germination, Seedling Growth, and Biochemical Responses of Sunflower (*Helianthus annuus* L.). Fuuast Journal of Biology vol. 1, No. 1, pp. 27-33 (2011).

Siddiqui, S. et al. Effect of UV-B radiation on seed germination, plant height, foliage and seed yield of soybean (*Glicine max* L. Merrill), Progressive Agriculture, 2007, vol. 7, pp. 42-45.

Vallad et al. Systemic Acquired Resistance and Induced Systemic Resistance in Conventional Agriculture, Crop Science, vol. 44: 1920-1934 (2004).

Vyn, T.J. et al. Potassium fertilization effects on isoflavone concentrations in soybean [*Glycine max* (L.) Merr.], Journal of Agricultural and Food Chemistry, 2002, vol. 50, pp. 3501-3506.

Wargent, J.J. et al. Increased exposure to UV-B radiation during early development leads to enhanced photoprotection and improved long-term performance in Lactuca sativa, Plant, Cell & Environment, 2011, vol. 34, pp. 1401-1413.

Wu, M. et al. Computational Evidence for the Role of *Arabidopsis thaliana* UVR8 as UV-B Photoreceptor and Identification of Its Chromophore Amino Acids, Journal of Chemical Information and Modeling, 2011, vol. 51, pp. 1287-1295.

(56) References Cited

OTHER PUBLICATIONS

European Patent Application No. EP15746659.0 Extended European Search Report dated Oct. 11, 2017.
European Application No. 15841342.7 European Search Report dated Feb. 13, 2018.
International Application No. PCT/IB2017/001152 International Search Report and Written Opinion dated Nov. 8, 2017.
Kakani, VG et al. Field crop responses to ultraviolet-B radiation: a review. Agricultural and Forest Meteorology, 120(1-4):191-218 (Dec. 24, 2003).
Liu, Bing et al. Effects of enhanced UV-B radiation on seed growth characteristics and yield components in soybean. Field Crops Research, 154:158-163 (2013).
Ozbolt, L. et al. Distribution of selenium and phenolics in buckwheat plants grown from seeds soaked in Se solution and under different levels of UV-B radiation. Food Chemistry 110(3):691-696 (Oct. 1, 2008).
European Application No. 15761440.5 Extended European Search Report dated Sep. 19, 2017.
U.S. Appl. No. 14/857,486 Non-Final Office Action dated Jun. 16, 2017.
Besteriro et al. *Arabidopsis* MAP kinase phosphatase 1 and its target MAP kinases 3 and 6 antagonistically determine UV-B stress tolerance, independent of the UVR8 photoreceptor pathway. Plant Journal 58:727-737 (2011).
Chen et al. Shoot-to-Root Mobile Transcription Factor HY5 Coordinates Plant Carbon and Nitrogen Acquisition. Curr Biol 26(5):640-646 (Mar. 2016).
Cluis e tal. The *Arabidopsis* transcription factor HY5 integrates light and hormone signaling pathways. Plant J 38(2):332-347 (2004).
Ebisawa et al. Supplementary ultraviolet radiation B together with blue light at night increased quercetin content and flavonol synthase gene expression in leaf lettuce (*Lactuca sativa* L.). Environmental Control in Biology 46(1):1-11 (2008).
European Application No. 15841342 Search Report and Opinion dated Feb. 13, 2018.
European Patent Application No. 15761440.5 Summons to Attend Oral Proceedings Pursuant to Rule 115(1) EPC dated Jun. 4, 2019.
Folta et al. Light as a Growth Regulator: Controlling Plant Biology with Narrow-bandwidth Solid-state Lighting Systems. Hortscience 43:1957-1964 (2008).
Gangappa et al. The Multifaceted Roles of HY5 in Plant Growth and Development. Mol Plant 9(10):1353-1365 (Oct. 2016).
Huche-Thelier et al. Light signaling and plant responses to blue and UV radiations-Perspectives for applications in horticulture. Environmental and Experimental Botany, Elsevier, Amsterdam, NL 121:22-38 (2015).
International Application No. PCT/IB2018/000839 International Search Report and Written Opinion dated Oct. 19, 2018.
International Application No. PCT/IB2018/001056 International Search Report and Written Opinion dated Apr. 3, 2019.
Jansen. Low threshold levels of ultraviolet-B in a background of photosynthetically active radiation trigger rapid degradation of the D2 protein of photosystem-II. The Plant Journal 9(5):693-699 (1996).
Kreft et al., Rutin in buckwheat herbs grown at different UV-B radiation levels: comparison of two UV spectrophotometric and an HPLC method. Journal of Experimental Botany. 53(375):1801-1804 (2002).
Lee et al. Analysis of transcription factor HY5 genomic binding sites revealed its hierarchical role in light regulation of development. Plant Cell 19(3):731-749 (2007).
Lydon et al. UV-B Radiation Effects on Photosynthesis. Growth and Cannabinoid Production of Two Cannabis Sativa Chemotypes. Photochemistry and Photobiology 46(2):201-206 (1987).
Musil et al. Ultraviolet-B Irradiation of Seeds Affects Photochemical and Reproductive Performance of the Arid-Environment Ephemeral Dimorphotheca Pluvialis. Environmental and Experimental Botany 34(4):371-378 (1994).
PCT/IB2018/000839 International Preliminary Report on Patentability dated Dec. 31, 2019.
Peykarestan et al., Uv irradiation effects on seed germination and growth, protein content, peroxidase and protease activity in redbean. International Research Journal of Applied and Basic Sciences. 3(1):92-102 (2012).
Qaderi et al. Morphological and physiological responses of canola (*Brassica napus*) siliquas and seeds to UVB and CO2 under controlledenvironment conditions. Environmental and Experimental Botany 60:428-437 (2007).
Setlow. The Wavelengths in Sunlight Effective in Producing Skin Cancer: A Theoretical Analysis. PNAS 71:3363-3366. (1974).
Tegelberg et al., Red : far-red light ratio and UV-B radiation: their effects on leaf phenolics and growth of silver birch seedlings. Plant, Cell & Environment. 27(8):1005-1013 (2004).
Tepfer et al. Survival of Plant Seeds, Their UV Screens, and nptll DNA for 18 Months Outside the International Space Station. Astrobiology 12:517-528 (2012).
U.S. Appl. No. 14/857,486 Advisory Office Action dated Jul. 27, 2018.
U.S Appl. No. 14/857,486 Final Office Action dated Jan. 13, 2020.
U.S. Appl. No. 14/857,486 Office Action dated May 16, 2019.
U.S. Appl. No. 15/125,698 Office Action dated Apr. 25, 2019.
U.S. Application No. 14/857,486 Non-Final Office Action dated Apr. 18, 2018.
Zoratti et al. Light-controlled flavonoid biosynthesis in fruits. Frontiers in Plant Science 5(534):16 pgs (2014).

\* cited by examiner

CONTROLLING CHARACTERISTICS OF PHOTOSYNTHETIC ORGANISIMS

CROSS-REFERENCE

This application is a 371 of International Application No. PCT/NZ2015/000008, filed Feb. 9, 2015, which claims the benefit of New Zealand Application No. 621039, filed on Feb. 10, 2014, each of which is incorporated herein by reference in its entirety.

TECHNICAL FIELD

The present invention relates to improvements in and relating to controlling characteristics of photosynthetic organisms. The invention includes a method for controlling one or more characteristics of a photosynthetic organism and a system for providing control over one or more characteristics of a photosynthetic organism.

BACKGROUND ART

Recent studies have shown that certain characteristics of photosynthetic organisms can be controlled by way of application of particular wavelengths of light. Non-limiting examples of characteristics that may be controlled include, a reduction in transplantation shock, alteration in colour, alteration in taste, reduction in disease, hardiness and/or transplant shelf life. The ability to reliably reproduce desirable characteristics in a photosynthetic organism requires a high degree of control over the dose of light, or regime of light dosages, in a treatment that the photosynthetic organism is subjected to.

Current systems that may be used for providing a dose of light to a photosynthetic organism are limited in their ability to provide the necessary high degree of control over the correct wavelengths, intensity and duration of light in a dose of light or dosages in a particular treatment. Each of the attributes of wavelength, intensity and duration play a significant role in the reproducibility of desirable characteristics. Therefore systems that do not provide control over any one of these attributes is unlikely to be able to provide the necessary reproducibility of desirable photosynthetic organism characteristics that a commercial system for providing a treatment in the form of a dosage of light would require.

A further disadvantage of current systems that may be used to provide a dose of light to a photosynthetic organism is one of scale. It will be appreciated that in a laboratory environment a single fixed light array may be used to treat a small number of photosynthetic organisms to determine the effect of a particular dose of light. However, on a commercial scale the number of photosynthetic organisms requiring a light treatment may require a vastly larger light array and correspondingly a large number of light emitters. Typically light emitters that produce wavelengths of light that are outside of the standard human visible light spectrum are expensive. Therefore the cost of producing a large light array of sufficient size to make a commercial photosynthetic organism dosing system commercially viable may be cost prohibitive.

It is an object of the present invention to address the foregoing problems or at least to provide the public with a useful choice.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

Throughout this specification, the word "comprise", or variations thereof such as "comprises" or "comprising", will be understood to imply the inclusion of a stated element, integer or step, or group of elements integers or steps, but not the exclusion of any other element, integer or step, or group of elements, integers or steps.

Further aspects and advantages of the present invention will become apparent from the ensuing description which is given by way of example only.

DISCLOSURE OF THE INVENTION

The present invention relates to a system for dosing photosynthetic organisms with a controlled dose of light. It will be appreciated that photosynthetic organisms rely on sunlight for processes such as photosynthesis. The term photosynthetic organism should be understood to refer to any organism, plant or animal that uses sunlight for the production of its own energy.

Particular wavelengths of natural light have been found to alter certain characteristics of photosynthetic organisms, for example their hardiness, colouration, flavour and disease and insect resistance, increased post-harvest and increased biosynthesis of valuable bio compounds. The present invention provides a system with which a photosynthetic organism can be subjected to a controlled dose of light in order to induce desirable characteristics in that photosynthetic organism.

According to one aspect of the present invention there is provided a light dosing system configured to direct light onto a target area, the light dosing system including:
a) one or more light emitters positioned above the target area;
b) a means for controlling one or more characteristics of the light emitted by the light emitters;
c) a conveyor configured to alter the relative positions of the light emitters and the target area; and
d) a lighting controller configured to read a media having a predefined dosage regime stored thereon,
wherein the lighting controller is configured to alter one or more characteristics of the light emitted by the, or each, of the one or more light emitters onto the target area in accordance with the predefined dosage regime.

In preferred embodiments the lighting controller may be programmed with one or more predefined dosage regimes.

A dosage regime should be understood to refer to a defined application of wavelengths of light to the target area. Each dosage regime will define a particular treatment for a photosynthetic organism located in the target area. Typically the dosage regime will define the wavelengths of light to be used, the intensity of those wavelengths of light and the period of time that the wavelengths are to be applied.

It will be appreciated that programming of the lighting controller with a predefined dosage regime may be performed in a number of ways, such as recording a dataset indicative of dwell times, light intensities and light emitters to activate or deactivate and rate of conveyance. It will be appreciated that the dataset will be readable and be able to be executed by the lighting controller. These aspects of the invention are considered to be well known in the art of embedded software design and are therefore aspects that would be well known to a person skilled in the art.

Alternative embodiments may include a manually adjustable interface through which one or more dosage regimes can be defined. A manually adjustable interface should be understood to refer to an interface that may optionally include manually configurable timers, intensity adjustments, cycle counters and/or the like.

In preferred embodiments the one or more dosage regimes are stored on a computer readable medium readable and executable by the lighting controller.

The light incident onto a target area may be provided in a number of ways without departing from the scope of the present invention. For example the light may be projected directly onto the target area from one or more light emitters. Alternatively, the light may be directed from one or more light emitters through one or more lenses, filters or light directing means onto the target area.

Preferably there will be a plurality of light emitters associated with the light dosing system. However, some embodiments (especially those operating over a smaller target area) may only require one light emitter. For the purposes of clarity the specification will refer to light emitters, it should however be appreciated that this term refers to both single and multiple light emitter configurations.

In preferred embodiments each light emitter is positioned above the target area. It will be appreciated that being positioned above the target area defines a vertical component to the relative positioning of the light emitters relative to the target area.

In preferred embodiments there is an array of light emitters.

The light emitters may take any number of forms without departing form the scope of the present invention. In some embodiments a number of different light emitters may be used in order to achieve a light dose that incorporates a desired range of light wavelengths. For example a combination of one or more of fluorescent, LED, HID, Halogen, mercury vapor or any other number of lighting technologies may be used for a desired light dose.

In preferred embodiments the means for controlling the one or more characteristics of the light emitted by the light emitters includes one or more filters.

In some preferred embodiments the means for controlling the one or more characteristics of the light emitted by the light emitters may include electronic control of the light emitters. It will be appreciated by persons skilled in the art that characteristics such as the intensity and wavelength(s) of light produced by some light emitters may be varied by altering the voltage/current supplied to the light emitters.

It will be appreciated by a skilled person that the light produced by a particular lighting technology may include wavelengths of light that are not desirable in a particular light dose.

Removal of undesirable wavelengths may be performed in a number of ways, for example, adding materials between the light emitters to filter and thereby block undesirable wavelengths of light from reaching the target area from the light emitters. For the purposes of the present application adding any materials for the purposes of blocking wavelengths of light should be understood to be encompassed within the definition of filtering. Filtering may be achieved by lenses, coatings or passing the light through specific materials. The exact configuration of the filter(s) should not be seen as being limiting and could be configured in any number of forms, such as, band pass, band stop, low pass or high pass configurations.

In preferred embodiments the means for controlling the one or more characteristics of the light emitted by the light emitters includes selective activation of light emitters that produce light having a specific spectral content.

It will be appreciated that different technologies of light emitters may be more effective, in terms of cost, or efficiency, at producing particular wavelengths of light. This may result in the use of a number of different light sources to produce a range of light wavelengths that may be useable in a light dose. For a particular dose some wavelengths may be required, only necessitating a small number of the available light sources to be activated. For other doses more, or even all, available wavelengths may be required, necessitating all of the available light emitters to be activated.

In some preferred embodiments the light emitted by the light emitters onto the target area may have a spectral content having wavelengths in the UV-A range of substantially 320 nm-400 nm.

The application of UV-A wavelengths elicit a range of known responses in photosynthetic organisms, non-limiting examples of which include leaf colour development in plants and elicitation of secondary metabolites in certain algae. It may also be desirable that UV-A wavelengths are excluded from a particular dosage. For example excluding UV-A wavelengths may be useful in insect pest vision disruption, or reduction of plant pathogen sporulation.

In some preferred embodiments the light emitted by the light emitters onto the target area may have a spectral content having wavelengths in the UV-B range of substantially 280 nm-320 nm.

UV-B wavelengths elicit a range of known responses in photosynthetic organisms. Non-limiting examples in plants include, stimulating increases in leaf thickness, induction of secondary metabolism activity, and reductions in stem elongation.

In some preferred embodiments the light emitted by the light emitters onto the target area may have a spectral content having wavelengths in the range of substantially 622 nm to 780 nm (Red).

Red wavelengths are an important component of photosynthetically active radiation utilized by photosynthetic organisms for photosynthetic activity. The balance of particular red wavelengths is also known to regulate stem and leaf elongation rates.

In some preferred embodiments the light emitted by the light emitters onto the target area may have a spectral content having wavelengths in the range of substantially 455 nm to 492 nm (Blue).

Blue wavelengths are an important component of photosynthetically active radiation utilized by photosynthetic organisms for photosynthetic activity. Blue light is also required for most photosynthetic organisms to routinely repair and thus limit day-to-day damage to genetic material, as may be caused by UV wavelengths.

Preferred embodiments of the lighting controller controls one or more of:
 the light intensity;
 the spectral content of the light emitted by the lighting system;
 the directionality of the light emitted by the lighting system; and/or
 the duration of time over which light is emitted.

The ability to control the intensity, spectral content, directionality and duration of light presented in a particular light dosage allows characteristics of a photosynthetic organism in the target area to be manipulated in highly reproducible and controlled manner.

Furthermore, the greater the control that is provided over the light dosage the greater the measurability of the response to a photosynthetic organism in the target area to that dose.

The intensity of the light produced by the light emitters may be controlled by one, or both of, electronic means or mechanical means.

Examples of suitable electronic control means may include, but should not be limited to pulse width modulation, current limiting, voltage limiting or the selective switching on or off of one or more light emitters.

Mechanical means for controlling the intensity may include mechanical filters or moving the light emitters relative to the target area, i.e. closer for increased intensity and more distant for decreased intensity.

Spectral content may be controlled in a number of non-limiting ways, such as: selectively activating various light emitters which produce different wavelength light outputs; mechanically switching filters into and out of the path of light emitted by one or more of the light emitters, or by altering the voltage/current into a particular light emitter.

The directionality of the light may be controlled by way of mechanically adjusting the angle of a framework to which the light emitters are attached.

In preferred embodiments the lighting controller controls the rate of conveyance of the one or more light emitters.

It will be appreciated that the conveyor may take any number of forms without departing form the scope of the present invention.

One non-limiting example is a movable gantry, or similar framework. A gantry may be self-propelling, i.e. it incorporates a motor and drive assembly, or alternatively it may be pulled by cables or the like. The conveyor may in some embodiments move the target area under the light emitters rather than moving the light emitters. For example the target area may be a portion of a conveyor system.

In preferred embodiments the conveyor is configured to adjustably locate the one or more light emitters over the target area.

In some embodiments, such as in large glasshouses, the target area may comprise a large physical area. In such cases it becomes cost prohibitive to include an array of light emitters of sufficient size to provide an effective dose of light to the full target area. In such cases a smaller mobile array of light emitters may be provided which can be mobilized so as to be capable of providing, over time, a light dose to the entire target area.

It may also be the case that the number of light emitters required to provide the desired intensity or wavelengths of light to the target area cannot be physically fitted on a single array. In such embodiments the array of light emitters and associated lenses, filters and or framework becomes physically larger than the area being dosed. A moveable array allows the physical dimensions of the array of light emitters to be larger than the dosage area whilst maximizing the target area that can be dosed.

Preferably the conveyor is configured to provide adjustment of the spacing between the one or more light emitters and the target area. The spacing may be adjusted vertically and/or horizontally with respect to the target area.

One limitation of many types of light emitters is that they produce light diffusely. Therefore, as the distance from the light emitters to the target area increases the intensity of the dosage is reduced. Similarly, as the distance between the light emitters and the target area decreases the intensity increases. It will be appreciated that as photosynthetic organisms grow the distance between the target area (the photosynthetic organism) and the light emitters decreases, effectively adjusting the dosage received.

Vertical adjustment of the light array provides a convenient means by which the dosage can be maintained as a photosynthetic organism grows.

In addition, in cases whereby a low dosage is required the light emitters can be moved further from the target area so as to provide a low intensity dose over a larger target area. In contrast a high intensity dose can be provided to a small target area by moving the light emitters closer to the target area. This has the advantage of providing both low and high dose levels at constant light emitter intensity.

Preferably the lighting controller includes one or more microprocessors.

In some embodiments the light dosing system may include a light sensor positioned at or near the target area.

Preferably the sensor provides feedback to the lighting controller.

Locating a light sensor at or near the target area allows the microprocessor to dynamically adjust the light produced by the light emitters to provide a desired light intensity at the target. It will be appreciated that in a glasshouse situation the presence and intensity of natural light may be used by the light dosing system to schedule dosages of light. Use of a light sensor may also be used to measure the levels of natural light so as to allow the light dosing system to supplement the existing light levels to provide a desired dosage.

In some preferred embodiments the lighting controller alters one or more characteristics of the light emitted by the light emitters onto the target area based on sensor feedback.

In some preferred embodiments the lighting controller is configured to adjust the dosage or select a particular dosage regime based on the feedback from a sensor. For example a particular photosynthetic organism may be identified by the sensor and the lighting controller may select a dosage regime based on the organism identified, or on the size, colour or some other attribute of the organism that is detected by the sensor.

It will be appreciated by the skilled person that the configuration of the light dosing system will depend upon both feedback from the sensor(s) as well as the dosage regime that has currently been selected. Aspects such as array height, rate of conveyance and emitter intensity may vary between instances of the same dosage regime based on the feedback from the sensor(s).

According to a further aspect of the present invention there is provided a method of controlling a light dosing system, the light dosing system including
one or more light emitters,
a means for controlling one or more characteristics of the light emitted by the light emitters onto a target area,
a conveyor configured to alter the relative positions of the light emitters and the target area, and
a lighting controller configured to control one or more characteristics of the light emitted by the light emitters, the method including the steps of:
  a) controlling one or more characteristics of the light emitted by the light emitters onto the target area by way of the lighting controller,
  b) conveying the one or more light emitters by way of the conveyor.

In some embodiments the method may include the additional step of providing feedback of the dosage of light from a light sensor to the lighting controller.

Preferably in response to feedback from the light sensor the lighting controller is configured to alter one or more characteristics of the light emitted by the light emitters.

According to yet a further aspect of the present invention there is provided a method of controlling a photosynthetic organism characteristic using a light dosing system, the light dosing system including one or more light emitters, a means for controlling one or more characteristics of the light emitted by the light emitters onto a target area, a conveyor configured to alter the relative positions of the light emitters and the target area, and a lighting controller configured to control one or more characteristics of the light emitted by the light emitters, the method including the steps of:

a) locating one or more photosynthetic organisms in the target area;

b) controlling one or more characteristics of the light emitted by light emitters onto the photosynthetic organisms in the target area.

Preferably the step of controlling one or more characteristics of the light emitted by the light emitters includes controlling one or more of:

the intensity of the light produced by the light emitters;
one or more aspects of the spectral content of the light emitted by the light emitters;
the directionality of the light emitted by the light emitters;
the position of the light emitters over the target area;
the height of the light emitters above the target area, and/or
the duration of time over which light is emitted by the light emitters.

Preferably the photosynthetic organism characteristic being controlled is one or more of:

hardiness;
transplantation shock;
post-harvest handling;
shelf life;
colour;
taste; and/or
disease resistance.

Preferred embodiments of the present invention may provide a number of advantages over the prior art, non-limiting examples of which include:

providing a system that allows a controlled light dose to be applied to a target area in a reproducable and commercially scalable manner.

Providing a system that allows a characteristic of a photosynthetic organism to be reproducably controlled on a commercial scale by way of a controlled dose of light to a target area in which the photosynthetic organism is located.

Providing a system that allows a controlled dose of light to be reproducably generated in which the wavelengths, intensity and duration of light dose is controlled.

Providing a system that requires few light emitters relative to the size of the target area.

BRIEF DESCRIPTION OF THE DRAWINGS

Further aspects of the present invention will become apparent from the ensuing description which is given by way of example only and with reference to the accompanying drawings in which.

BEST MODES FOR CARRYING OUT THE INVENTION

Figure 1:
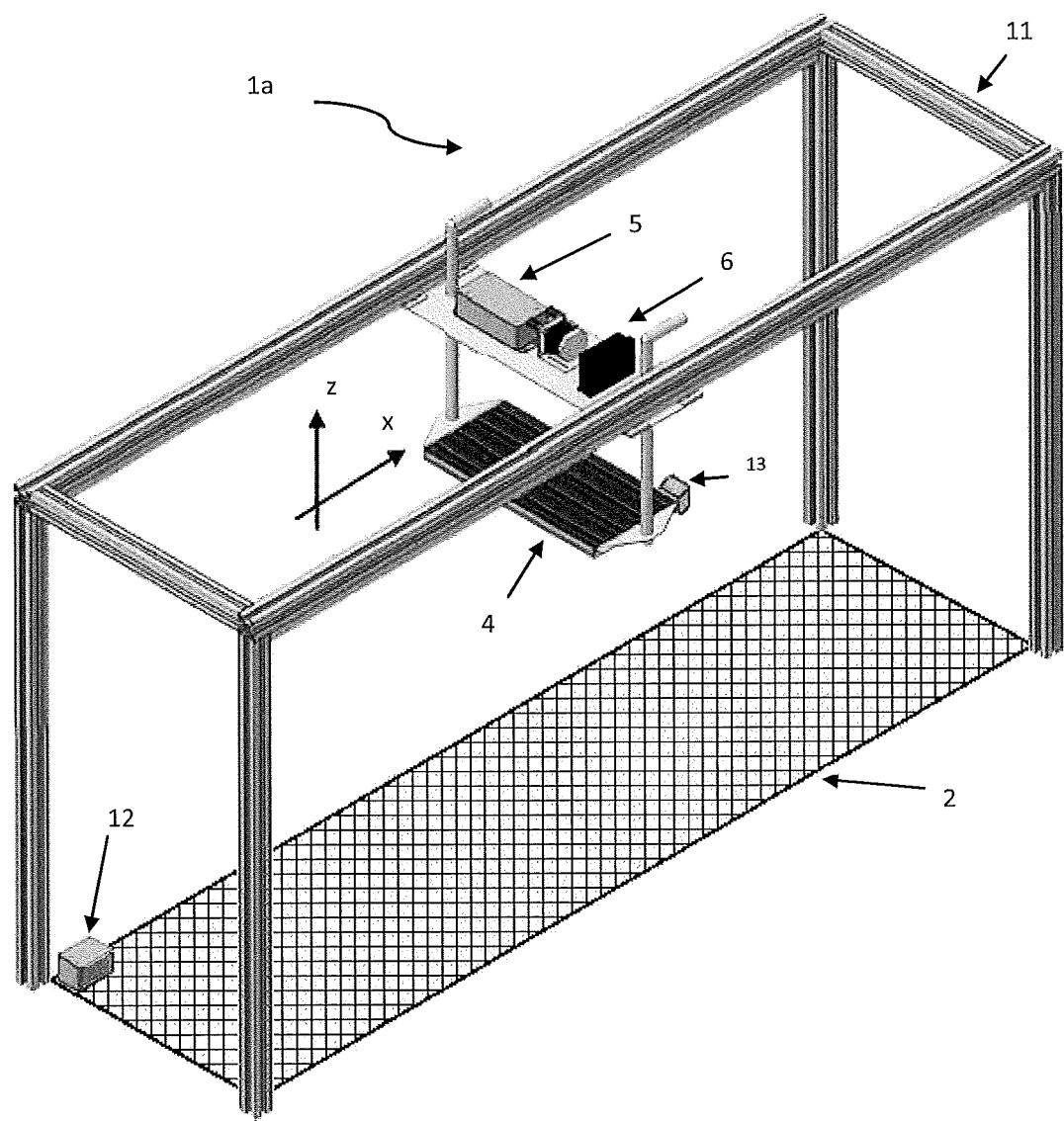
FIG. 1 shows a perspective view of a first system for dosing photosynthetic organisms in accordance with one preferred embodiment of the present invention.
Figure 2:
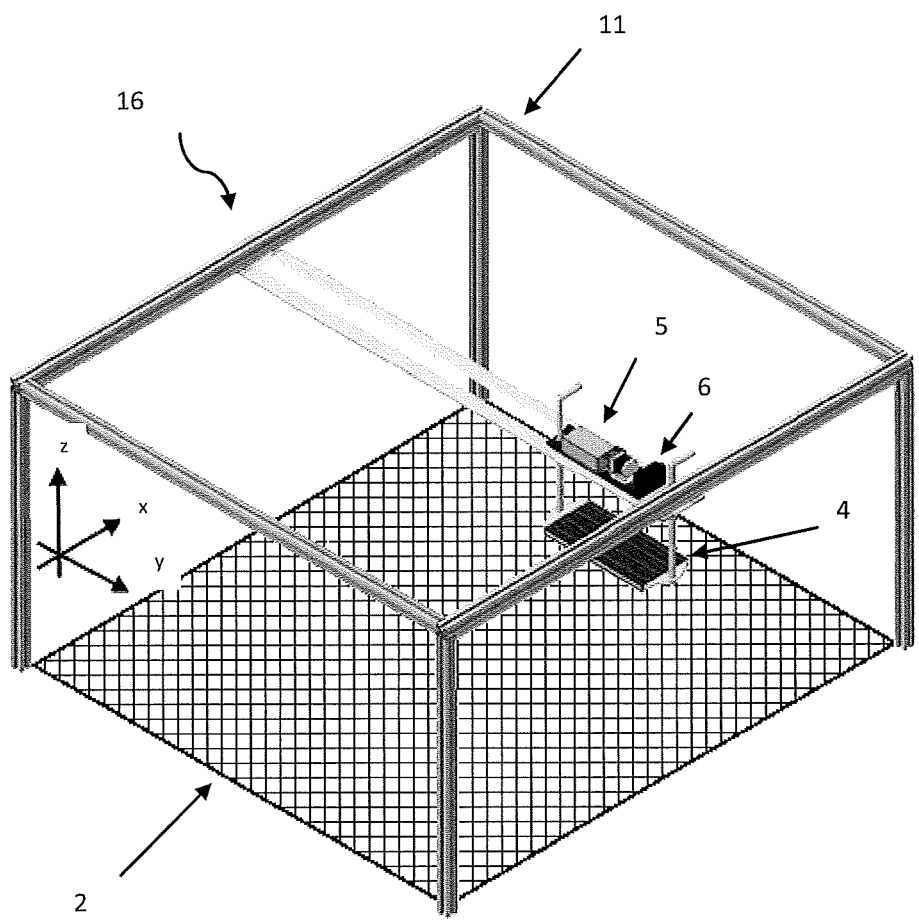
FIG. 2 shows a perspective view of a second system for dosing photosynthetic organisms in accordance with one preferred embodiment of the present invention.
Figure 3:
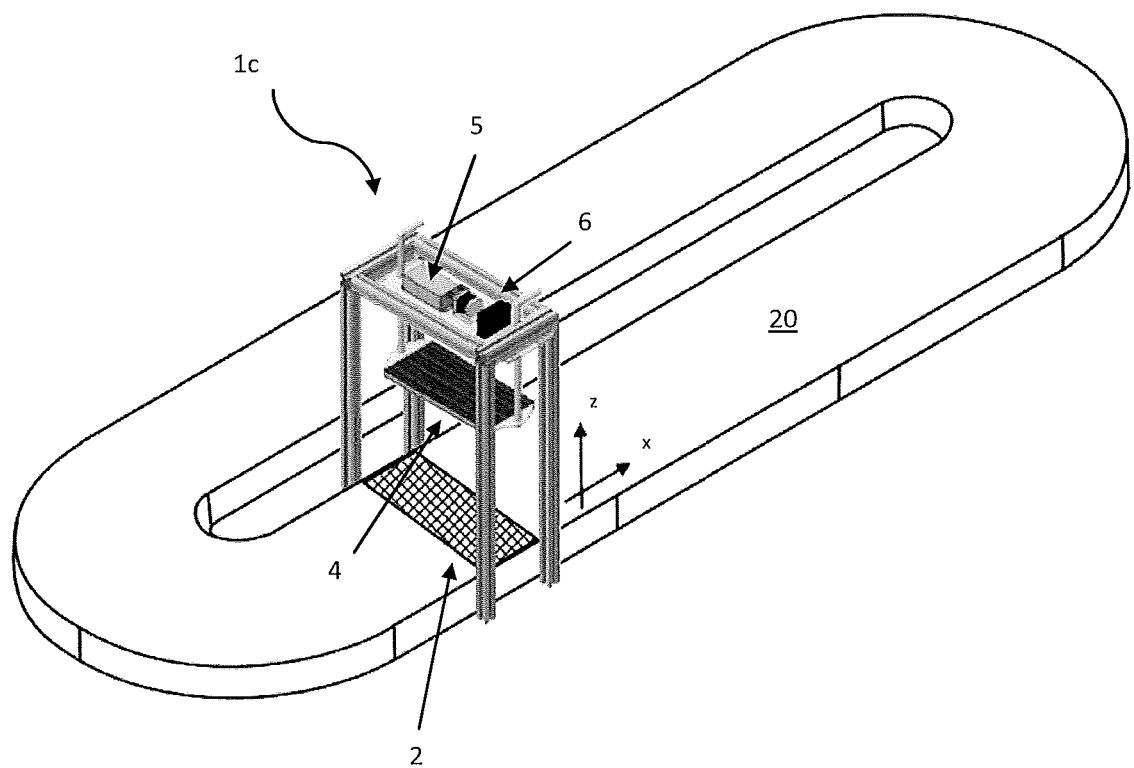
FIG. 3 shows a perspective view of a third system for dosing photosynthetic organisms in accordance with one preferred embodiment of the present invention.

With reference to FIGS. 1 to 3 there are shown three variations of systems for dosing photosynthetic organisms in the form of plants with a controlled dose of light. It should however be appreciated that the systems described with reference to FIGS. 1 to 3 could be configured for dosing other photosynthetic organisms.

FIG. 1 illustrates a first system 1*a* which provides conveyance of lighting array 4 in X and Z directions.

The second system 1*b* of FIG. 2 provides conveyance of lighting array 4 in X, Y and Z directions.

The third system 1*c* of FIG. 3 provides motion in X, Y, Z directions.

The systems 1*a*, 1*b* and 1*c* shown in FIGS. 1 to 3 illustrate that there are a numerous variations possible in the physical configuration of the present invention. It should also be appreciated that the scale of the gantry 11 shown in FIGS. 1 and 2 may be scaled to industrial size gantry systems such as those commonly found in factories.

The light dosing systems 1*a*, 1*b* and 1*c* are each configured to direct light onto a target area 2, shown as hashed, within which, in use, one or more plants (not shown) will be positioned. It will be appreciated that the number of plants which can be dosed is limited only by the scale of the light dosing system. It is however envisaged that commercial system will be capable of dosing several thousand plants.

Each of the light dosing systems 1*a*, 1*b*, 1*c* includes light emitters 3 (shown in FIG. 4) attached to a lighting module 4. The lighting module 4 may simply carry the light emitters 3, however in some cases it may form a heat-sink, or contain drive circuitry, for the light emitters should either be required. The lighting module 4 and attached light emitters 3 are positioned above the target area 2 such that the light emitted from the light emitters 3 is directed downwards onto the target area 2 and, in use, any plants within the target area 2.

Microprocessor and associated electronic drive circuitry 5 control one or more characteristics of the light emitted by the light emitters 3. It will be appreciated that the microprocessor and associated drive circuitry 5 will vary depending upon the topology of the light emitters 3 used and the number of sensors or the like used by the system. The microprocessor and associated drive circuitry 5 is configured to control the light intensity, the spectral content, the directionality of and the duration of time over which light is emitted by the light emitters 3, all in accordance with a predefined dosage regime (not shown). The predefined dosage regime may be programmed into the microprocessor or an associated media readable by the microprocessor. Programming of the microprocessor with new or additional dosage regimes could be achieved in any number of ways, such as, but not limited to, the addition of additional media such as a memory module, programming of the media readable by the microprocessor or the microprocessor's memory by way of USB or wireless technology or by entering an additional dosage regime by way of a user interface associated with the microprocessor.

Each of the systems 1a, 1b and 1c control the intensity of the light by a combination of adjusting the drive voltage/current supplied to the light emitters 3 and physically moving the lighting module 4 to which the light emitters 3 are attached.

The drive voltage adjustment varies depending on the light emitter 3 topology, for example LEDs may use pulse width modulation (PWM), or current control. Other light emitter technologies may use one or more of current control, voltage control or PWM.

In systems 1a, 1b and 1c movement of the lighting module 4 is performed by an electronic actuator in the form of vertical adjustment motor 6. By moving the lighting module 4 closer towards the target area 2 the intensity of light on the target area 2 can be increased and by moving the lighting module 4 further away from the target area 2 the intensity of light can be reduced. In some embodiments the vertical adjustability of the lighting array 4 may be performed manually rather than being automatically adjusted by the system.

The spectral content of the light incident on the target area 2 is controlled by way of the selective activation of different light emitters 3. The light emitters 3 may be arranged in groups according to the wavelengths of light they produce, or in groups of dissimilar wavelength producing light emitters. It will be appreciated that the light emitters in the array may be arranged in a number of ways without departing from the scope of the present invention. The aspects of the light emitter are discussed in further detail in relation to FIG. 4.

Each of the systems 1a, 1b, 1c includes a conveyor, FIGS. 1 and 2 use a gantry 7. The gantry of FIG. 1 provides travel in the X direction and the gantry of FIG. 2 provides travel in both the X and Y directions. The size and shape of the gantry may vary without limitation and, in use, will be configured to suit a particular size of installation.

Alternative embodiments may use other forms of conveyor rather than a gantry system, for example in the system 1c of FIG. 3 the lighting array remains stationary whilst a portion of a conveyor belt 20 passes through the target area 2. Systems that use a conveyor belt will typically have a lighting array that is fixed in an X and Y direction but may include a variable Y axis, or height, relative to the conveyor belt. At any particular instant in time the target area is the region of the moving conveyor belt that is being illuminated by the light emitters. That particular instant of a target area moves relative to the light emitters as time passes. The function of the conveyor 7 is to move a relatively small lighting module 4 relative to a larger target area 2.

The ability to move the lighting module 4 relative to the target area 2 reduces the cost of the lighting module 4, due to the reduced number of light emitters necessary to cover a particular target area, as well as allowing a larger variety of light emitters to be positionable over a particular target area.

The conveyor of FIGS. 1, 2 and 3 also provide vertical adjustment of the lighting module 4 by way of motors 6. Vertical adjustment allows the intensity of a light dose to be adjusted as well as a particular dosage intensity to be maintained as the plants being dosed grow and move closer to the lighting module 4. The vertical adjustment of the lighting module may be performed automatically by the system, or alternatively the vertical adjustment may be performed manually.

Figure 4:
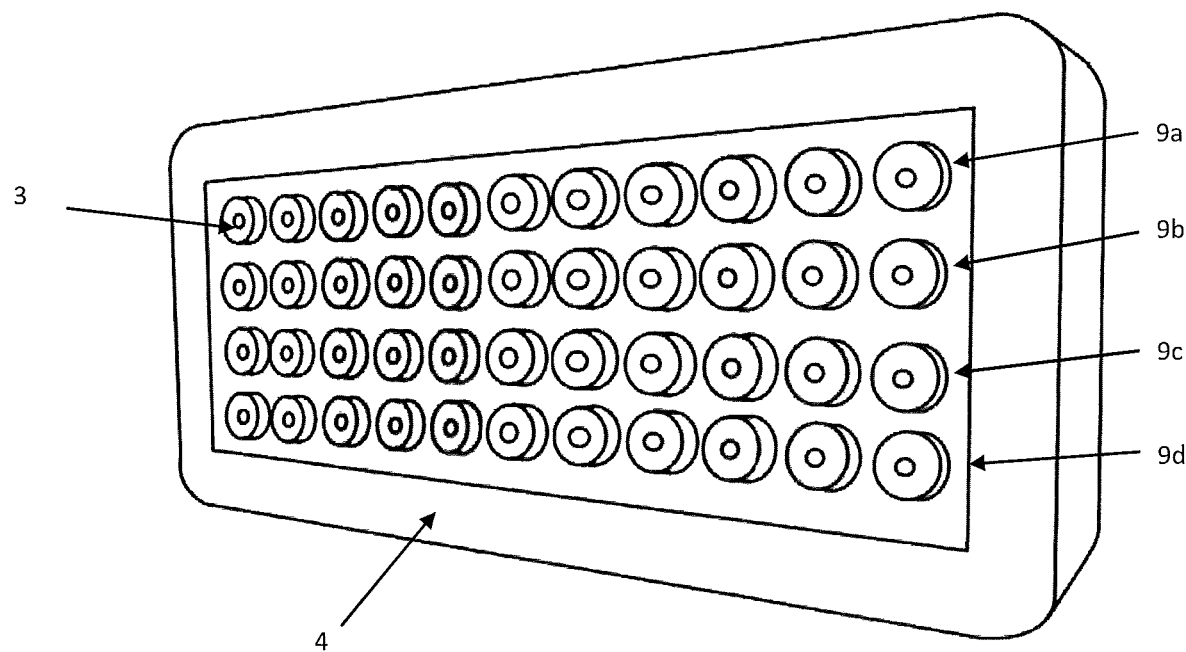
FIG. 4 shows a perspective view of a lighting module in accordance with one preferred embodiment of the present invention.

With reference to FIG. 4 there is shown a lighting module 4 as used by one preferred embodiment of the present invention. The lighting module 4 includes a plurality of light emitters as generally indicated by designator 3. The array shown in FIG. 4 includes four rows, 9a, 9b, 9c and 9d, each row comprising 11 individual light emitters 3. Each of the rows of light emitters 9a, 9b, 9c and 9d, comprise light emitters capable of producing light in a specific spectral range. Row 9a provides wavelengths of light in the UV-A part of the spectrum, row 9b provides wavelengths of light in the UV-B part of the spectrum, row 9c provides wavelengths of light in the blue part of the spectrum and row 9d provides wavelengths of light in the red part of the spectrum.

The proximity of the individual light emitters in each of the rows 9a, 9b, 9c and 9d provides an overlap of the light emitted onto the target area by adjacent light emitters. This overlap of light emission allows the intensity of a dose to be varied by selectively activating only some of the light emitters in a particular row. For example, a maximum dosage may be applied by activating all light emitters in a row 9a, 9b, 9c, 9d, and a minimum dose may be applied by activating only one light emitter in a row 9a, 9b, 9c, 9d.

The system 1a shown in FIG. 1 includes a light sensor 12 positioned in the target area 2. The light sensor 12 provides feedback of the light intensity measured at the target area 2. By monitoring the light intensity in the target area the lighting controller can adjust the height of the light emitters up or down in order to automatically achieve a desired dosage intensity. In some embodiments separate sensors may be provided for each type of wavelength that is to be used in a dosage. It will be appreciated that a typical light sensor may not have a linear response characteristic, therefore separate sensors may be needed for measurement of each desired part of the spectrum.

The light dosing system of FIG. 1 also includes a sensor 13 for determining the height of the lighting module from the top of the plants being dosed (not shown). In some alternative embodiments sensor 13 may include a range of sensors, optionally including humidity, pressure, temperature and colour sensors.

It will be appreciated that as the plants grow they move closer to the light emitters 3 and thereby may increase the light dosage they receive to a level greater than is desirable. By detecting the distance from the lighting module 4 to the top of the plants being dosed the lighting controller is able to automatically adjust for plant growth in order to provide the correct dosage level.

It will be appreciated that a sensor is an optional element to the system as equivalent results can be achieved by calibration of the system for a height/intensity relation and typical plant growth rates. The advantage of sensing the light levels is that the ambient lighting conditions can be factored into a dosage intensity as well as being used for cyclical timing to match natural light patterns.

Aspects of the present invention have been described by way of example only and it should be appreciated that modifications and additions may be made thereto without departing from the scope thereof as defined in the appended claims.

What is claimed is:

1. A light dosing system for controlling a characteristic of a photosynthetic organism, the light dosing system configured to direct light onto a target area, the light dosing system consisting of:
   a) at least one light emitter providing a source of light positioned above the target area, the light emitted comprising UV-B light of a specific spectral content between 280-320 nm, red light of a specific spectral content between 622-780 nm, and blue light of a specific spectral content between 455-492 nm;

b) at least one of an electronic control and a mechanical control for a light emitted by the light emitter;

c) a conveyor configured to adjust a relative position of the light emitter and the target area; and d) a lighting controller configured to read a media having a predefined dosage regime stored thereon, wherein said lighting controller is configured to adjust at least one characteristic of a source of light emitted by the light emitter onto the target area in accordance with the predefined dosage regime.

2. The light dosing system of claim 1, wherein the light emitter is in an array.

3. The light dosing system of claim 1, wherein the characteristic of the photosynthetic organism is at least one of hardiness, color, taste, disease resistance, transplantation shock resistance, post-harvest handling durability, and shelf life.

4. The light dosing system of claim 1, wherein the photosynthetic organism is reproducibly controlled.

5. The light dosing system of claim 1, wherein at least one of a wavelength, an intensity, and a duration of a light dose is reproducibly administered.

* * * * *

UNITED STATES PATENT AND TRADEMARK OFFICE
CERTIFICATE OF CORRECTION

PATENT NO. : 10,721,875 B2
APPLICATION NO. : 15/117157
DATED : July 28, 2020
INVENTOR(S) : Jason John Wargent, Matthew John Van DerWerff and Terry Robin Southern It is certified that error appears in the above-identified patent and that said Letters Patent is hereby corrected as shown below:

On the Title Page

(54) the title and In the Specification, Column 1, Lines 1-2, reading:
'Controlling Characteristics Of Photosynthetic Organisms'
Should read:
--Improvements In And Relating To Controlling Characteristics Of Photosynthetic Organisms--.

(86) the PCT No.: reading:
'PCT/NZ2015/000008'
Should read:
--PCT/NZ2015/00008--.

Signed and Sealed this
Fourteenth Day of June, 2022

Katherine Kelly Vidal
*Director of the United States Patent and Trademark Office*